May 31, 1966     H. J. BUTLER     3,253,681

SPOT TYPE DISC BRAKES FOR VEHICLES

Original Filed March 2, 1961     4 Sheets-Sheet 1

May 31, 1966 H. J. BUTLER 3,253,681
SPOT TYPE DISC BRAKES FOR VEHICLES
Original Filed March 2, 1961 4 Sheets-Sheet 2

Inventor.
Henry James Butler
by Benj. T. Rauber
his attorney

May 31, 1966 H. J. BUTLER 3,253,681
SPOT TYPE DISC BRAKES FOR VEHICLES
Original Filed March 2, 1961 4 Sheets-Sheet 3

Inventor
Henry James Butler
by Benj. T. Dauber
his attorney

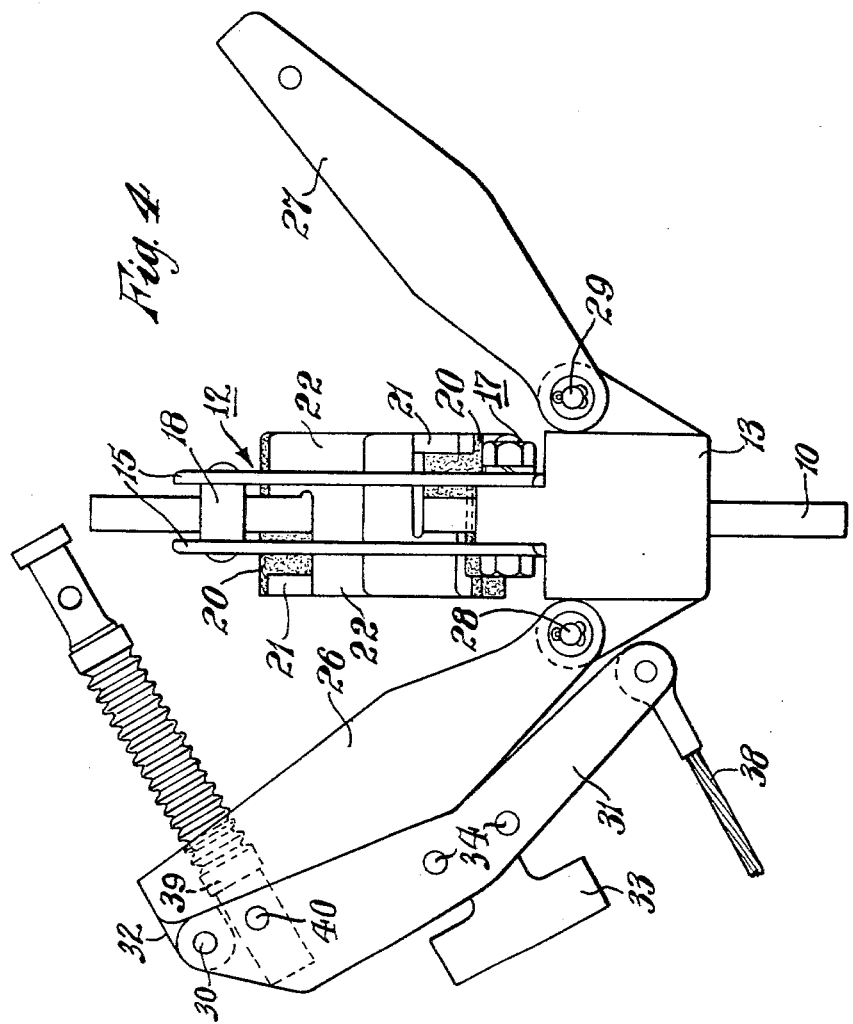

United States Patent Office 3,253,681
Patented May 31, 1966

3,253,681
SPOT TYPE DISC BRAKES FOR VEHICLES
Henry James Butler, Sutton Coldfield, England, assignor to Dunlop Rubber Company Limited, London County, England, a British company
Continuation of application Ser. No. 92,864, Mar. 2, 1961. This application Jan. 31, 1964, Ser. No. 341,797
Claims priority, application Great Britain, Mar. 5, 1960, 7,885/60
9 Claims. (Cl. 188—73)

This application is a continuation of my copending United States application filed March 2, 1961, Serial No. 92,864, and now abandoned.

In British patent specification No. 709,305, there is described a disc brake which includes a caliper straddling the braking disc and having opposed apertures in its limbs, friction pads mounted to slide in the apertures in the caliper, operating levers for the friction pads mounted on the caliper and a fluid pressure operated mechanism located remote from the pads for moving the operating levers inwardly towards the disc to bring the pads into engagement therewith.

The present invention provides an improved construction of disc brake in which provision is made for ready removal and replacement of the friction pads.

With this object in view, the brake according to the invention includes detachable connections which, when detached, permit relative movement of the caliper and the operating levers to a position permitting withdrawal of the pads from the caliper. Thus provision may be made whereby on removal of bolts or the like the apertured portion of the caliper may be swung about one end thereof into a position in which the apertures are clear of the disc, and operating levers, so enabling the friction pads to be drawn in the direction of the axis of the disc. Alternatively the caliper may be removed bodily, with or without the operating levers, from the structure supporting it, and the friction pads can again be withdrawn from the apertures in the caliper. As a further alternative, provision may be made whereby the operating levers can be swung about their points of attachment to the caliper to expose the friction pads and allow their axial withdrawal from the apertures in the caliper while the caliper remains fixed.

The invention will now be described in more detail with reference to the accompanying drawings in which:

FIGURE 2 illustrates the brake structure of FIGURE 1, but looking at the brake and rotor side in elevational view.

Figure 1:
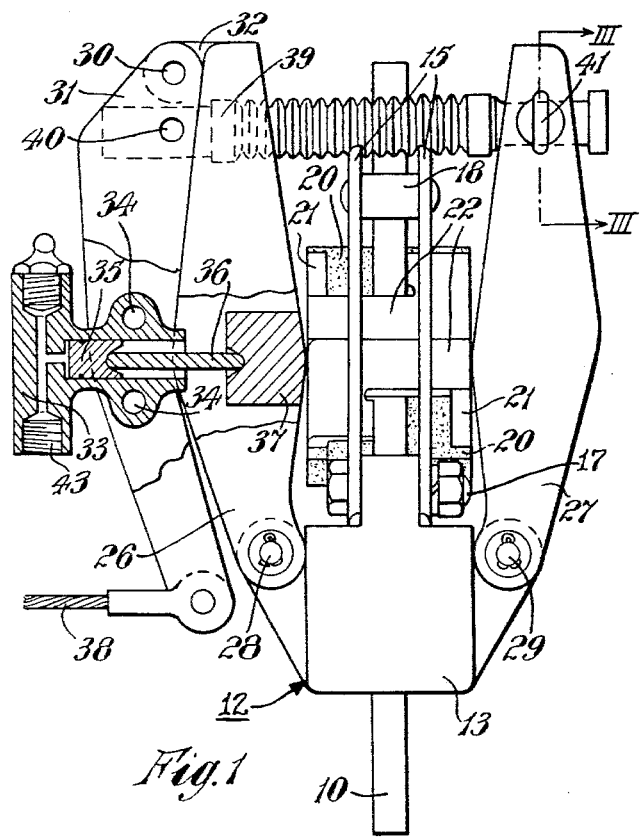
FIGURE 1 is an axial view of the brake assembly, showing both the disc and the fixed or nonrotatable portions of the brake, a part of the actuating system of the brake being shown in section.

The disc brake shown in the drawings includes a braking disc 10 attached to a wheel (not shown) of a vehicle to be braked. Attached to a fixed part 11 of the vehicle is a caliper 12, which includes an end member 13 fixed by a bolt 14 to the part 11, and a pair of guide plates 15, one on each side of the disc 10, fixed to the part 11 and the member 13 by bolts 16 (FIG. 2), 17 (FIGS. 2, 5), respectively. The guide plates 15 are located a fixed distance apart by spacer 18. Each of the guide plates is provided with an aperture 19 (FIG. 5) in which is slidably mounted a friction pad assembly, constituted by a friction pad 20 and an associated backing plate 21 to which the friction pad is fixed. As explained more fully in application No. 92,921, now issued as United States Patent No. 3,124,217, and dated March 10, 1964, the backing plates 21 have out-turned ears 22, each of which is accommodated in a groove in the other backing plate and abuts against the companion ear 22 on the other backing plate. The ears 22 contact the outer edges of the apertures 19 in the guide plates while the friction pads 20 contact the side edges of these apertures. Consequently, when the friction pad assemblies are moved towards and away from the disc 10 by the mechanism shortly to be described they are prevented from tilting. The are accordingly presented square to the disc 10 and do not wear unevenly.

Figure 3:
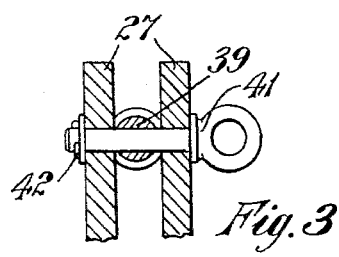
FIGURE 3 is a sectional view taken on line III—III of FIGURE 1.
Figure 4:
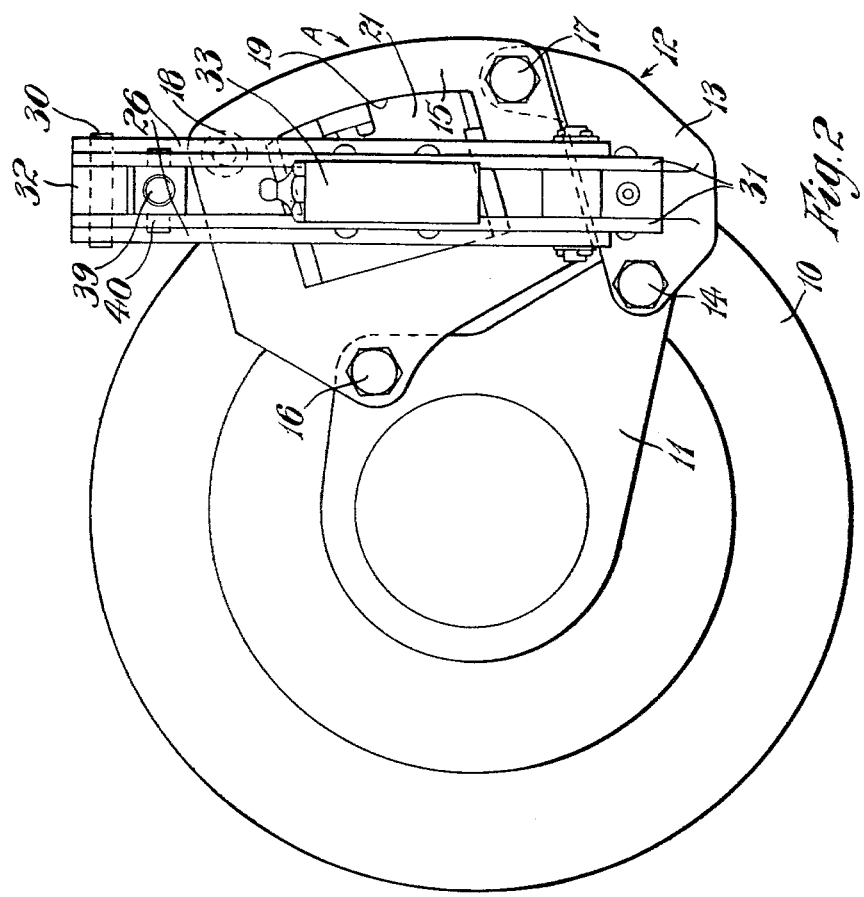
FIGURE 4 is a view similar to FIGURE 1, showing the operating levers swung into a position exposing the friction pads for removal.

The friction pad assemblies are applied by bifurcated actuating levers 26, 27 which are pivoted to the caliper at 28, 29 respectively. Pivoted by a pin 30 to an extension 32 of the lever 26 is a bifurcated operating lever 31. A cylinder 33 is fixed by studs 34 to the lever 31. In the cylinder 33 is a piston 35, and a thrust rod 36 is positioned between the piston and a block 37 fixed to the lever 26. A cable 38 connects the hand brake (not shown) to the lever 31, which is connected to the lever 27 by a link 39, pivoted by a pin 40 to the lever 31 and by a removable pin 41 to the lever 27. The pin 41 is held in place by a cotter pin 42 (FIG. 3), but is removable to permit the levers 26, 27 to be swung about their pivots 28, 29, as shown in FIGURE 4 to allow removal of the friction pad assemblies from the apertures 19 in the guide plates 15.

When fluid under pressure is admitted through an inlet 43 to the cylinder 33, the cylinder 33 and the piston 35 are moved apart, so causing the levers 26, 27 to move inwards to engage the friction pads 20 at the opposite sides of the disc 10 with the opposed braking surfaces provided by the disc 10. Similarly, on operation of the hand brake, the resulting tension on the cable 38 will cause inward movement of the levers 26, 27 to apply the brake.

Figure 5:
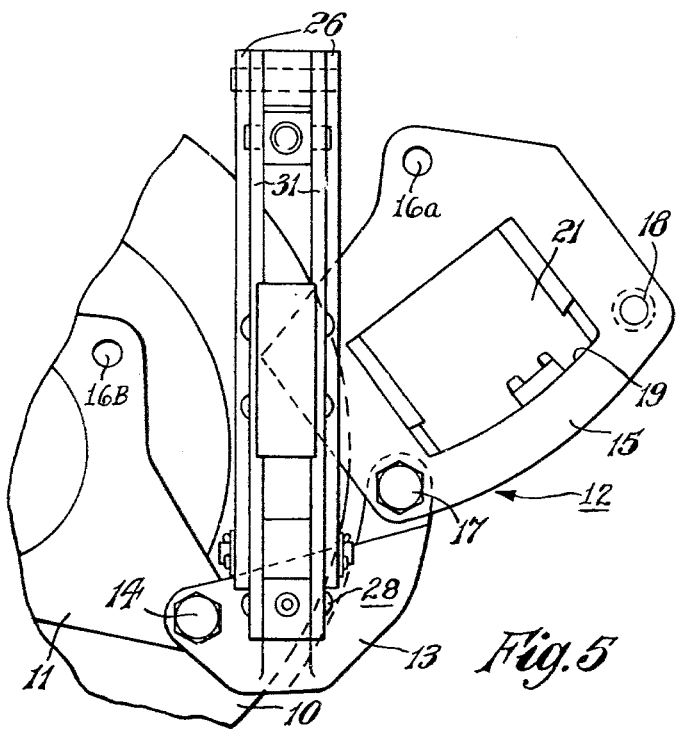
FIGURE 5 is a view similar to FIGURE 2, showing the caliper swung radially outwardly on one of its mounting bolts and into a position exposing the friction pads for removal.

Alternatively, and as shown in FIGURE 5, access to the friction pad assemblies to enable them to be removed from the apertures 19 in the guide plates 15 may be obtained by removing the bolts 16 from the registered openings 16a and 16b in the guide plates and fixed part 11 respectively, and swinging the guide plates 15 about the bolt 17.

As a further alternative, access to the friction pads for the purpose of removing them may be achieved by bodily removal of the caliper 12 from the structure supporting it.

Although the present invention has been illustrated and described in connection with a single example embodiment, it will be understood that this is illustrative of the invention and is by no means restrictive thereof and it is reasonably to be expected that those skilled in this art can make numerous revisions and adaptations of the invention to suit individual design preferences. It is intended that such revisions and adaptations which incorporate the herein disclosed principles, will be included within the scope of the following claims as equivalents of the invention.

Having now described my invention, what I claim is:
1. A disc brake comprising a rotatable axially-fixed disc, a nonrotatable support member, a nonrotatable caliper secured to said support member and straddling a periphery of said disc, a pair of torque-taking guides plates positioned one on each side of said disc and each operatively attached at one end to the caliper and at the other end to the support member, said guide plates each having an aperture, a friction element in and mounted to slide into and from frictional engagement with said disc in said apertures, a pair of friction element applying levers each pivotally secured at one end thereof to the caliper and extending on opposite sides of the disc to bear against said friction elements, and an operating means for said levers operatively connected to the levers to swing said levers towards said disc to move said friction elements into frictional engagement with said disc, and detachable means to attach said guide plates to the caliper and the support member respectively which, when detached, permits relative displacement of the guide plates and the levers to provide for freeing of said friction elements by withdrawal from the apertures.

2. A disc brake comprising a rotatable disc, a support means in fixed position relative to said disc, a pair of friction elements, one element on each of opposite sides of said disc, support members for said friction elements secured for pivotal movement to said support means and comprising supporting sides disposed as limbs one on each side of said disc, said limbs each having an aperture in which one of said friction elements is slidably held to slide into and out of frictional engagement with said disc, and a friction applying means comprising a pair of levers linked at one end and bearing against said friction elements, an operating device acting upon one of said levers and connected operatively to the opposite lever to swing both of said levers toward said disc and effect movement of said friction elements into frictional engagement with opposite sides of said disc, and releasable means forming a part of said friction-applying means and removable to provide an access clearance for withdrawal of said friction elements from said apertures and additional releasable member providing upon their removal a pivotal movement of said support means to displace the coacting friction elements radially beyond said rotor and into releasable positions.

3. In a disc brake having a rotatable disc, the structure comprising a support means in fixed position relative to said disc, a pair of friction elements one on each side of said disc and frictionally engageable therewith, support members one on each side of said disc and each providing aperture means for a respective one of said friction elements, means pivotally mounting said support members to provide pivotal movement of said friction elements radially outwardly to positions wherein said friction elements are releasable from the coacting aperture means of said support members, friction applying means forcing said friction elements by slidable movements within said aperture means into frictional engagement with said rotor and comprising a pair of levers linked at one end and extending on opposite sides of said support members to act against said friction elements, an operating device to actuate said levers, and a releasable element forming a part of said applying means and removable to provide swinging of said levers away from their associated friction elements to permit access for withdrawal of said friction elements from their associated aperture means.

4. A brake according to claim 3 in which said support members are pivotally secured to said support means to permit said support members to swing clear of the said pair of levers.

5. A brake according to claim 3 having a linkage between said levers which includes said releasable element that is detachable to permit said levers to swing apart for withdrawal of said friction elements.

6. A brake according to claim 3 in which said operating device includes a fluid pressure operated means.

7. A brake according to claim 6 in which said operating device bears against one of said levers and comprises a link detachably connected to the other lever.

8. A brake according to claim 7 in which said operating device comprises a third lever pivoted to one lever of said pair of levers and a link connecting said third lever to the other lever of said pair and in which said fluid operated means acts between said third lever and the lever on which it is pivoted.

9. A brake according to claim 8 in which said operating means is manually actuated.

References Cited by the Examiner

UNITED STATES PATENTS

| 2,830,679 | 4/1958 | Butler | 188—73 |
| 2,907,412 | 10/1959 | Butler | 188—73 |
| 3,051,272 | 8/1962 | Burnett | 188—73 |
| 3,053,346 | 9/1962 | Butler | 188—73 |
| 3,124,219 | 3/1964 | Lee | 188—73 X |
| 3,184,004 | 5/1965 | Butler | 188—73 |

FOREIGN PATENTS 1,037,217    8/1958    Germany.

MILTON BUCHLER, *Primary Examiner.*

EUGENE G. BOTZ, ARTHUR L. LA POINT,
*Examiners.*

G. E. A. HALVOSA, *Assistant Examiner.*